United States Patent
Revelino et al.

(10) Patent No.: US 11,167,681 B2
(45) Date of Patent: Nov. 9, 2021

(54) DRIVE UNIT FOR A SLIDE-OUT ROOM

(71) Applicant: LCI Italy s.r.l., Florence (IT)

(72) Inventors: Lawrence Revelino, Norco, CA (US); Rupert Wilkins, Norwich (GB); Fabio Romagnoli, Florence (IT); Daniel K. Rodabaugh, Elkhart, IN (US)

(73) Assignee: LCI ITALY S.R.L., Florence (IT)

( * ) Notice: Subject to any disclaimer, the term of this patent is extended or adjusted under 35 U.S.C. 154(b) by 253 days.

(21) Appl. No.: 16/531,333

(22) Filed: Aug. 5, 2019

(65) Prior Publication Data
US 2020/0307438 A1 Oct. 1, 2020

(30) Foreign Application Priority Data

Mar. 26, 2019 (EP) .................................. 19165211

(51) Int. Cl.
  B60P 3/34 (2006.01)
  F16H 25/20 (2006.01)
(52) U.S. Cl.
  CPC ............... B60P 3/34 (2013.01); F16H 25/20 (2013.01)
(58) Field of Classification Search
  CPC ...... B60P 3/39; B60P 3/32; B60P 3/34; F16H 25/20
  See application file for complete search history.

(56) References Cited

U.S. PATENT DOCUMENTS

| | | | |
|---|---|---|---|
| 3,512,315 A * | 5/1970 | Vitalini | E04B 1/3431 52/67 |
| 4,253,283 A | 3/1981 | May | |
| 5,634,683 A | 6/1997 | Young | |
| 5,915,774 A * | 6/1999 | Tiedge | B60P 3/34 296/26.13 |
| 6,234,566 B1 | 5/2001 | Cyr et al. | |
| 6,266,931 B1 | 7/2001 | Erickson et al. | |
| 6,415,675 B1 * | 7/2002 | Schneider | B62D 33/08 188/69 |

(Continued)

FOREIGN PATENT DOCUMENTS

| CN | 204236331 U | 4/2015 |
|---|---|---|
| WO | WO 2016/159769 | 10/2016 |

OTHER PUBLICATIONS

Australian Examination Report No. 1 dated Jun. 16, 2020 issued in Australian Patent Appication No. 2019205976, 7 pp.

*Primary Examiner* — David M Fenstermacher
(74) *Attorney, Agent, or Firm* — Nixon & Vanderhye P.C.

(57) ABSTRACT

A drive unit for a slide-out room of a recreational vehicle includes a rotary component, an elongate component, and a structural member configured to be coupled to a wall panel of the slide-out room and having an elongate cavity. The elongate component and the rotary component are arranged within the elongate cavity of the structural member and are configured to mesh such that a rotary motion of the rotary component results in a linear motion of the elongate component together with the structural member relative to the rotary component. Advantageously, the drive unit may further include a guide member and a guide rail, where the guide rail is integrated into the elongate cavity of the structural member and where the guide member and the guide rail are configured to cooperate to support the linear motion of the structural member.

14 Claims, 6 Drawing Sheets

(56) References Cited

U.S. PATENT DOCUMENTS

| | | | |
|---|---|---|---|
| 6,422,628 B1* | 7/2002 | Bortell | B60P 3/14 |
| | | | 296/26.13 |
| 6,471,275 B1 | 10/2002 | Kunz et al. | |
| 6,619,714 B2* | 9/2003 | Schneider | B60P 3/34 |
| | | | 296/171 |
| 6,871,897 B1* | 3/2005 | Snyder | B60P 3/34 |
| | | | 296/165 |
| 6,938,939 B2 | 9/2005 | Blodgett, Jr. | |
| 7,258,382 B2* | 8/2007 | Kunz | A47B 21/0073 |
| | | | 296/26.13 |
| 7,309,092 B2 | 12/2007 | Garceau et al. | |
| 7,607,365 B1* | 10/2009 | Courser | B60P 3/34 |
| | | | 296/171 |
| 7,614,675 B2 | 11/2009 | Kunz | |
| 7,871,114 B2* | 1/2011 | Schultz | B60P 3/34 |
| | | | 296/26.14 |
| 8,016,343 B2* | 9/2011 | Schwindaman | B60P 3/34 |
| | | | 296/171 |
| 8,266,843 B2* | 9/2012 | Gardner | B60P 3/34 |
| | | | 52/67 |
| 2002/0023393 A1 | 2/2002 | McManus | |
| 2002/0060467 A1* | 5/2002 | McManus | B60P 3/34 |
| | | | 296/26.01 |
| 2005/0161963 A1* | 7/2005 | Peter | B60P 3/34 |
| | | | 296/26.01 |
| 2005/0230989 A1* | 10/2005 | Nebel | B60P 3/34 |
| | | | 296/26.01 |
| 2010/0066025 A1* | 3/2010 | Kreil | B60P 3/34 |
| | | | 277/315 |
| 2012/0035813 A1 | 2/2012 | Kreil | |
| 2018/0086248 A1 | 3/2018 | Rodabaugh | |

* cited by examiner

DRIVE UNIT FOR A SLIDE-OUT ROOM

CROSS-REFERENCES TO RELATED APPLICATIONS

This application claims the benefit of European Patent Application No. 19165211.4, filed Mar. 26, 2019, the entire content of which is herein incorporated by reference.

STATEMENT REGARDING FEDERALLY SPONSORED RESEARCH OR DEVELOPMENT (Not applicable)

BACKGROUND

This invention relates to a drive unit for a slide-out room, more specifically to a drive unit for a slide-out room of a recreational vehicle or similar mobile living quarters. The invention furthermore relates to a slide-out room assembly comprising such a drive unit.

It is generally known to provide recreational vehicles, such as motor homes, fifth-wheel trailers, and travel trailers with a retractable or slide-out room for increasing the living space of the vehicle. The retractable or slide-out room may be extended for use when the vehicle is parked and should be retracted into the main living area of the vehicle when the vehicle is to be moved. In other words, a slide-out room installed in a vehicle may be extended to effectively increase the interior volume of the vehicle, and retracted to reduce the exterior footprint of the vehicle. Existing retractable or slide-out rooms can be time-consuming and difficult to install. Frequently, the operating mechanisms consist of many separate components that must be individually installed, connected and adjusted by highly-trained employees when the unit is assembled. After the vehicle is put into service, adjustments by the vehicle owner are often necessary.

In order to operate such a slide-out room a mechanism is needed which allows the slide-out room to be extended and to be retracted. Several types of such mechanisms are known from the prior art.

In a first type of drive mechanisms drive screws are employed for operating the slide-out room. By rotating the drive screws in a first direction the slide-out room may be extended, whereas by rotating the drive screws in a second direction, opposite to the first direction, the slide-out room may be retracted. Slide-out room drive mechanisms of this type are known, for example, from U.S. Pat. Nos. 5,634,683, 6,266,931 B1, 6,471,275 B1, 4,253,283, or WO 2016/159769 A1. A problem with this type of mechanism is that the length of a drive screw limits the amplitude of movement of the slide-out room because the amplitude cannot be greater than the length of the drive-screw. Screws, however, should be short for practical reasons, including the tendency of a longer screw to deflect so that the axis of the screw is no longer absolutely straight, which greatly impairs operability of the screw.

In a second type of drive mechanisms geared racks and pinions are employed for operating the slide-out room. In these systems geared racks are usually arranged on the exterior surfaces of the floor or side walls of the slide-out room and motor-driven pinions engaged with the geared racks are mounted to the vehicle. The pinions can be operated to drive the racks and the room to which they are attached in and out of the vehicle. Slide-out room drive mechanisms of this type are known, for example, from U.S. Pat. No. 6,234,566 B1, 6,938,939 B2, 7,614,675 B2, US 2012/0035813 A1, or U.S. Pat. No. 8,016,343 B2. A problem with this type of mechanism is that the geared racks arranged on the exterior surfaces of the slide-out room are usually exposed to the environment when the slide-out room is extended and may thus attract or otherwise engage with dirt, debris, or foreign objects that could hinder proper operation of the mechanism and allow for moisture to enter the vehicle.

In a third type of drive mechanisms cables are employed for operating the slide-out room, often in combination with pulleys. An example of such a system is described in U.S. Pat. No. 7,309,092 B2. These mechanisms employing cables are usually complicated to install and to maintain and are often prone to failure.

BRIEF SUMMARY

Therefore, a need exists for an improved drive mechanism for a slide-out room of a recreation-al vehicle. It is an object of this invention to provide a drive unit for a slide-out room of a recreational vehicle for realizing such an improved drive mechanism which also provides for an excellent water seal.

According to a first aspect of the invention there is provided a drive unit for a slide-out room of a recreational vehicle, the drive unit comprising a rotary component, an elongate component, and a structural member configured to be coupled to a wall panel of the slide-out room. The structural member of the drive unit comprises an elongate cavity. The elongate component and the rotary component are arranged within the elongate cavity of the structural member and are configured to mesh such that a rotary motion of the rotary component results in a linear motion of the elongate component together with the structural member relative to the rotary component.

By providing the structural member of the drive unit of the invention with an elongate cavity and by arranging the elongate component and the rotary component within this elongate cavity, the elongate component and the rotary component can be conveniently protected from ad-verse environmental impact, such as environmental damage by contamination, for example by dirt or other foreign objects. Furthermore, the drive unit of the invention comprising the structural member with a cavity housing the rotary component and the elongate component can be designed to be a compact module which can be easily integrated into slide-out rooms of various sizes and shapes. Since the structural member is configured to be coupled to a wall panel of the slide-out room, the drive unit of the invention readily integrates into the slide-out room to provide an excellent water seal. Advantageously, by being coupled to a wall panel, the structural member is integrated into a wall of the slide-out room.

Advantageously, the rotary component of the drive unit of the invention is configured to be driven by a motor which remains in a fixed position and therefore does not cause movement of the motor harness. When set into motion, e.g., by such a motor, the rotary component, which meshes with the elongate component, will set the elongate member into motion and the elongate component will—together with the structural component—move in a linear motion relative to the rotary component.

Advantageously, the rotary component is a pinion and the elongate component is a rack, such as a toothed rack, configured to mesh with the pinion. Other equivalent interengaging, relatively movable members, such as welded chains and sprockets, a cog and stamping, and other similar structures may also be used to implement the rotary and elongate components.

Preferably, the elongate component is fixedly attached to the structural member. Then, when-ever the elongate component is driven via the rotary component, the structural member will also be automatically driven. In accordance with the invention, the structural member and the elongate component may be made from two different materials. Advantageously, the structural member is made from aluminum. Preferably, the structural member is an aluminum profile, most preferably an extruded aluminum profile. According to the invention the elongate component may be made from steel, aluminum, or hard plastics such as Delrin. Advantageously, the rotary component is made from steel. Further suitable materials for the rotary component and the elongate component include powder metal or composites.

In accordance with the invention, the elongate component may also be integrally formed with the structural member. Then, it would no longer be necessary to attach the elongate component to the structural member in a separate manufacturing step.

Advantageously, the drive unit of the present invention further comprises a guide member and a guide rail. The guide rail is preferably integrated into the elongate cavity of the structural member and the guide member and the guide rail are advantageously configured to cooperate to support the linear motion of the structural member.

With such a guide rail and guide member the operation of the drive unit of the invention can be improved. They allow better control of the extension and retraction of the slide-out room the drive unit is integrated into by supporting the linear motion of the structural member of the drive unit.

Advantageously, the guide member comprises or is a guide roller. Preferably, the guide roller is made from a nonabrasive or hard plastic. The guide roller is advantageously configured to roll along the guide rail with low friction.

In accordance with the invention, the guide member may also comprise or be a sliding block or a slide shoe or a similar structure which is configured to glide along the guide rail with low friction.

Advantageously, the drive unit of the invention further comprises a drive shaft, wherein the rotary component and the guide member are axially arranged on the drive shaft. Thus, a compact design can be achieved. Preferably, the guide member comprises a guide roller which is axially arranged on the drive shaft together with the rotary component. Preferably, guide roller and rotary component are configured to rotate about a common axis defined by the drive shaft. Advantageously, the rotary component is configured to be driven by the drive shaft and the guide roller is arranged on the drive shaft.

Advantageously, the guide member has a substantially v-shaped cross section and the guide rail comprises angled bearing faces which are shaped complementary to the cross section of the guide member. The v-shaped cross section of the guide member together with the complementary shaped angled bearing faces of the guide rail help to ensure that the guide member will reliably travel along the guide rail. Also lateral support may be provided by this arrangement.

In the drive unit of the invention, the guide rail and the guide member are preferably configured to cooperate so as to result in a reduction of load exerted on the rotary component by the structural member. This reduction of load will help improve operation of the slide-out room. Since the slide-out room is operated by setting the structural member of the drive unit in motion, which in turn is achieved by rotating the rotary component, it is beneficial if the load exerted on the rotary component by the structural member is reduced. This way, the rotary component can better serve its main purpose, i.e., drive the linear motion of the structural member via driving the elongate component. The drive mechanism realized by the rotary component and the elongate component will work better if the rotary component does not have to bear the full load of the structural member. This will also reduce wear of the rotary component and increase its life span. To this end, it is advantageous to have another component, such as the guide member/guide rail, which will serve as a load bearing component. If the drive unit of the invention is integrated into a slide-out room, the load exerted on the structural member can be significant. It will then be of particular importance to include a component into the drive unit which will take up this load (or at least a significant fraction of this load) and pass it on to a solid load bearing structure.

Advantageously, the guide rail of the drive unit of the invention has a two-part structure which allows the guide rail to support the linear motion of the structural member irrespective of whether the structural member is arranged in a first orientation or in a second orientation different from the first orientation. With such a guide rail the versatility of the drive unit of the invention can be improved. For example, it is possible to integrate two identical drive units into a slide-out room, but mount them in different orientations, i.e., while the first drive unit is mounted in a specific orientation, the second drive unit is mounted in another orientation, e.g., upside down. Although the second drive unit is mounted upside down, the guide system comprising the guide member and the guide rail will still work because the guide rail has a two-part structure which allows the guide rail to support the linear motion of the structural member in two different orientations, for example in a first orientation and in a second reverse, i.e., upside down orientation.

Advantageously, the guide rail comprises a first rail section and a second rail section, wherein the first rail section and the second rail section are arranged at distinct positions and different, preferably opposing, orientations.

Advantageously, the drive unit of the present invention further comprises a worm drive including a worm wheel and a worm screw configured to cooperate with the worm wheel such that a rotary motion of the worm screw results in a rotary motion of the worm wheel, wherein the rotary motion of the worm wheel results in rotary motion of the rotary component. With such a worm drive the drive unit of the invention can be conveniently coupled to a motor, such as an electric motor, for driving the drive unit. The worm drive will reduce the rotational speed of the motor and transmit the force of the motor to the drive unit with high torque, which is convenient for driving the drive unit and a slide-out room the drive unit is integrated into.

In case the drive unit comprises a drive shaft, the worm wheel is advantageously coupled to the drive shaft. Then a torque can be transmitted from the worm wheel to the rotary component via the drive shaft. Also, a highly compact design can be achieved.

Advantageously, the worm wheel and the worm screw are located outside the elongate cavity of the structural member. This allows easy access to the worm wheel and the worm screw. In particular, with a worm wheel and worm screw located outside the elongate cavity, a motor can be conveniently coupled to the worm screw, in particular a motor located outside the elongate cavity of the structural member. Preferably, the worm screw is directly mounted on the drive shaft of the motor.

Advantageously, the structural member of the drive unit of the invention is configured to form an edge of a slide-out room. With such a drive unit a slide-out room can be easily assembled, for example by providing four drive units forming four edges of a box-shaped slide-out room and by attaching panels to the drive units so as to form walls of the slide-out room, such as two side walls, floor and ceiling. Each of the four panels used for the two side walls, floor and ceiling could be arranged between and attached to a respective pair of drive units. In this way a lightweight slide-out room with a clean appearance can be obtained.

Advantageously, the structural member of the drive unit of the invention is designed for constructing a box-shaped slide-out room. In accordance with the invention it may also be de-signed for constructing a slide-out room of any other shape or geometry, in particular a polyhedral slide-out room.

Advantageously, the structural member of the drive unit of the invention comprises an opening extending essentially along the elongate cavity and configured to allow access to the elongate cavity of the structural member from outside of the elongate cavity or from outside of the structural member. Via this opening the interior of the elongate cavity can be reached or accessed from outside. In particular, the opening allows access to the rotary component arranged within the elongate cavity from outside. This is convenient because it allows a component con-figured to drive the rotary component, such as a motor, to be arranged outside the elongate cavity although the rotary component itself is located inside the elongate cavity. Since the opening extends essentially along the elongate cavity, the rotary component travelling along the structural member within the elongate cavity can be reached from outside at any time and at any position.

Advantageously, the drive unit of the invention further comprises a seal member which is attached to the structural member such as to cover the opening. With such a seal member the elongate cavity of the structural member can be protected from contamination or pollution. Preferably, the seal member is flexible.

Advantageously, the seal member has a two-piece structure with a first piece arranged near a first edge of the opening and a second piece arranged near a second edge of the opening. With such a two-piece structure of the seal member reliable and effective sealing can be achieved. In addition, with the two-piece structure flexibility of the seal member can be improved, so that if an object, such as a drive shaft or a mounting bracket, is passed through the seal member into the elongate cavity of the structural member, the two pieces of the structural member may close tightly around the object so as to ensure that the opening is still sufficiently sealed.

Advantageously, the shape and size of the first piece of the seal member is essentially identical to the shape and size of the second piece of the seal member. This has many practical ad-vantages, such as lowering production costs or reducing the number of different components required for assembling the drive unit. Within this document the term "essentially" relates to and includes tolerances of up to +/−10%.

According to another aspect of the invention there is provided a slide-out room assembly for a recreational vehicle. The slide-out room assembly comprises a slide-out room comprising a drive unit as described above and a mounting frame configured to be integrated into an opening provided in a wall of the recreational vehicle. The drive unit is operatively mounted to the mounting frame such that the structural member of the drive unit is configured to be translated relative to the mounting frame upon rotation of the rotary component.

The slide-out room of the slide-out room assembly of the invention may comprise one or more drive units. The mounting frame of the slide-out room assembly advantageously serves as mounting structure for mounting the slide-out room to the recreational vehicle. Advantageously, the mounting frame comprises or is a narrow perimeter frame. For installing the slide-out room assembly of the invention in a recreational vehicle, the mounting frame is installed in an opening which is provided in a wall of the recreational vehicle. The mounting frame is prefer-ably fixedly attached to the wall of the vehicle. Since the drive unit is operatively mounted to the mounting frame such that the structural member of the drive unit is configured to be translated relative to the mounting frame upon rotation of the rotary component, rotating the rotary component will allow the slide-out room to be operated, i.e., to be extended and to be retracted.

Advantageously, the slide-out room assembly of the invention further comprises a seal which is mounted to the mounting frame and arranged to cover and seal a gap between the mounting frame and the slide-out room. With this seal unwanted effects of a gap provided between the mounting frame and the slide-out room, which gap allows the slide-out room to be extended and to be retracted relative to the mounting frame, can be mitigated. In particular, the seal will help to avoid that water, moisture, dirt or other unwanted substances enter into the vehicle through the gap. In addition, the seal might be configured to provide thermal insulation and/or sound insulation.

Advantageously, the seal is a rubber V seal. Preferably, the seal is a circumferential seal, i.e., a seal which surrounds or encircles the slide-out room along its entire circumference. Advantageously, the seal is an endless ring. Then the gap surrounding the slide-out room can be sealed without any ends of the seal abutting. Abutting ends or edges would represent weak spots of the seal which are prone to failure. The seal is preferably releasably attached to the mounting frame. This way, a damaged seal can be easily replaced by a new seal.

Advantageously, the slide-out room assembly of the invention further comprises a motor con-figured to drive the rotary component of the drive unit, wherein the motor is mounted to the mounting frame or to a wall of the recreational vehicle. The motor driving the rotary component allows the slide-out room to be operated, i.e., to be extended and to be retracted. Since the motor is mounted to the mounting frame or to a wall of the recreational vehicle, the motor is stationary with respect to the vehicle. That is, when the motor is operated, the motor does not move relative to the vehicle. This simplifies greatly the wiring of the motor. Furthermore, since the motor does not move relative to the vehicle, it is possible to provide a stationary housing or case for the motor within the vehicle.

Advantageously, the slide-out room of the slide-out room assembly of the invention comprises a first panel and a second panel. The structural member of the drive unit is preferably attached to the first panel and to the second panel so as to form an edge of the slide-out room. Then, a large portion of the slide-out room can be constructed just from three pieces, i.e., from the first panel, the second panel, and the drive unit. For example, the first panel may serve as a side wall of the slide-out room and the second panel may serve as ceiling of the slide-out room. The structural member of the drive unit may then serve as edge unit connecting the side wall to the ceiling, preferably along the entire length or depth of the slide-out room.

Advantageously, the slide-out room of the slide-out room assembly of the invention comprises a first panel and a second panel. The structural member of the drive unit is preferably attached to the first panel and to the second panel and arranged between the first panel and the second panel such that the first panel, the structural member, and the second panel together form a wall of the slide-out room. With such arrangement a very compact wall design can be achieved. A wall of the slide-out room may consist of two wall panels and one drive unit, with the structural member of the drive unit arranged between the wall panels. The structural member of the drive unit may then serve as wall unit connecting two wall panels. Additional wall panels and additional drive units may be included in the wall. For example, three wall panels and two drive units may be included in a wall or four wall panels and three drive units.

A slide-out room assembly of the invention may comprise wall units and edge units in any practical combination. According to a non-limiting example a slide-out room assembly may comprise four edge units and two wall units. One or several wall units may also be integrated into the ceiling or the floor. Advantageously, a wall unit integrated into the ceiling or the floor is optimized for this type of mounting.

Advantageously, in the slide-out room assembly of the invention a wall formed by a first pan-el, the structural member of a drive unit, and a second panel is flat. A slide-out room may comprise one or more of such wall modules. The drive unit integrated into such a wall module may be referred to as wall unit.

Advantageously, the slide-out room assembly comprises more than one drive unit. Including a larger number of drive units in a slide-out room may allow for better control of the operation of the slide-out room, since as the number of drive units increases, the load of each drive unit decreases. In addition, the impact of a failure of one of the drive units, for example caused by a motor failure, will be reduced if the slide-out room comprises a larger number of drive units because even if one drive unit fails there might be enough working drive units left for operating the slide-out room.

BRIEF DESCRIPTION OF THE DRAWINGS

Specific embodiments of the invention will now be described by way of example and with reference to the accompanying drawings, in which:

FIG. 6b shows another perspective view of the slide-out room assembly of FIG. 6a.

DETAILED DESCRIPTION

Figure 1:
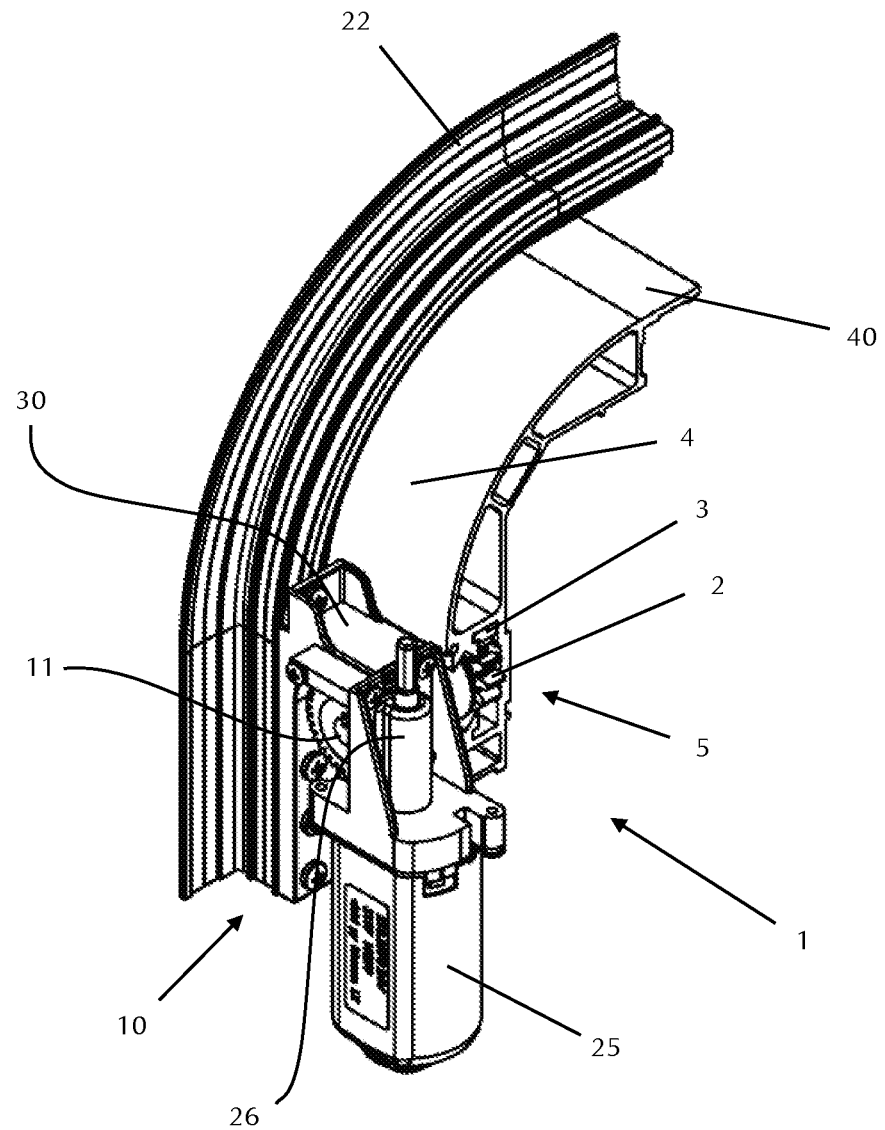
FIG. 1 shows a perspective view of a drive unit in accordance with the invention with a motor unit attached to a mounting frame.

FIG. 1 shows a perspective view of a drive unit 1 in accordance with the invention. The drive unit 1 comprises a rotary component 2, an elongate component 3, and a structural member 4. In the embodiment shown in FIG. 1 the rotary component 2 is a pinion and the elongate component 3 is a rack. Pinion 2 meshes with rack 3 such that a rotary motion of pinion 2 results in a linear motion of rack 3. Rack 3 is connected to or integrated into structural member 4 in such a way that rack 3 will take along structural member 4 as rack 3 is being driven by pinion 2.

As shown in FIG. 1, structural member 4 comprises an elongate cavity 5, and pinion 2 and rack 3 are arranged within this elongate cavity 5. Furthermore, structural member 4 is configured to be coupled to a wall panel of a slide-out room. To this end, structural member 4 comprises mounting portions for mounting wall panels to the structural member. In the embodiment shown in FIG. 1 these mounting portions are implemented by flanges integrated into structural member 4. One of these flanges 40 is shown in FIG. 1. A wall panel of the slide-out room can be glued or otherwise attached to flange 40. In the embodiment shown in FIG. 1 structural member 4 is a profile which may have been obtained from an extrusion process, such as an aluminum profile or a plastic profile. Flange 40 is integrally formed with structural member 4.

In the embodiment shown in FIG. 1 a motor 25 is provided for driving drive unit 1. Motor 25 is coupled to pinion 2 via a worm drive 10 comprising a worm wheel 11 and a worm screw. Worm wheel 11 is shown in FIG. 1, whereas the worm screw is hidden from view by cover 26 attached to motor 25. Worm drive 10 transmits the rotational motion of motor 25 to pinion 2 with reduced speed but increased torque. Motor 25 is mounted on mounting frame 22 by mounting bracket 30. With mounting bracket 30 motor 25 is releasably attached to mounting frame 22 so that motor 25 can be attached to and released from mounting frame 22. During operation of the slide-out room, however, motor 25 will remain attached to mounting frame 22 and will remain stationary, i.e., will not move relative to mounting frame 22. Also worm drive 10 and pinion 2 will remain stationary. Rack 3 and structural member 4, however, will not remain stationary during operation of the slide-out room. Both components will be driven to travel relative to mounting frame 22 in a linear motion. In FIG. 1 only sections of mounting frame 22 and structural member 4 are shown.

Since motor 25 remains stationary with respect to mounting frame 22 during operation of the slide-out room, any cables or wires required for operating and controlling motor 25 can be conveniently installed in the vehicle with the slide-out room. For example, wires may be fixed to mounting frame 22 and mounting frame 22 may comprise corresponding wire mounting members, such as wire holders or cable brackets. Or wires may be fixed to the wall of the vehicle, advantageously in a region adjacent to mounting frame 22.

Figure 2:
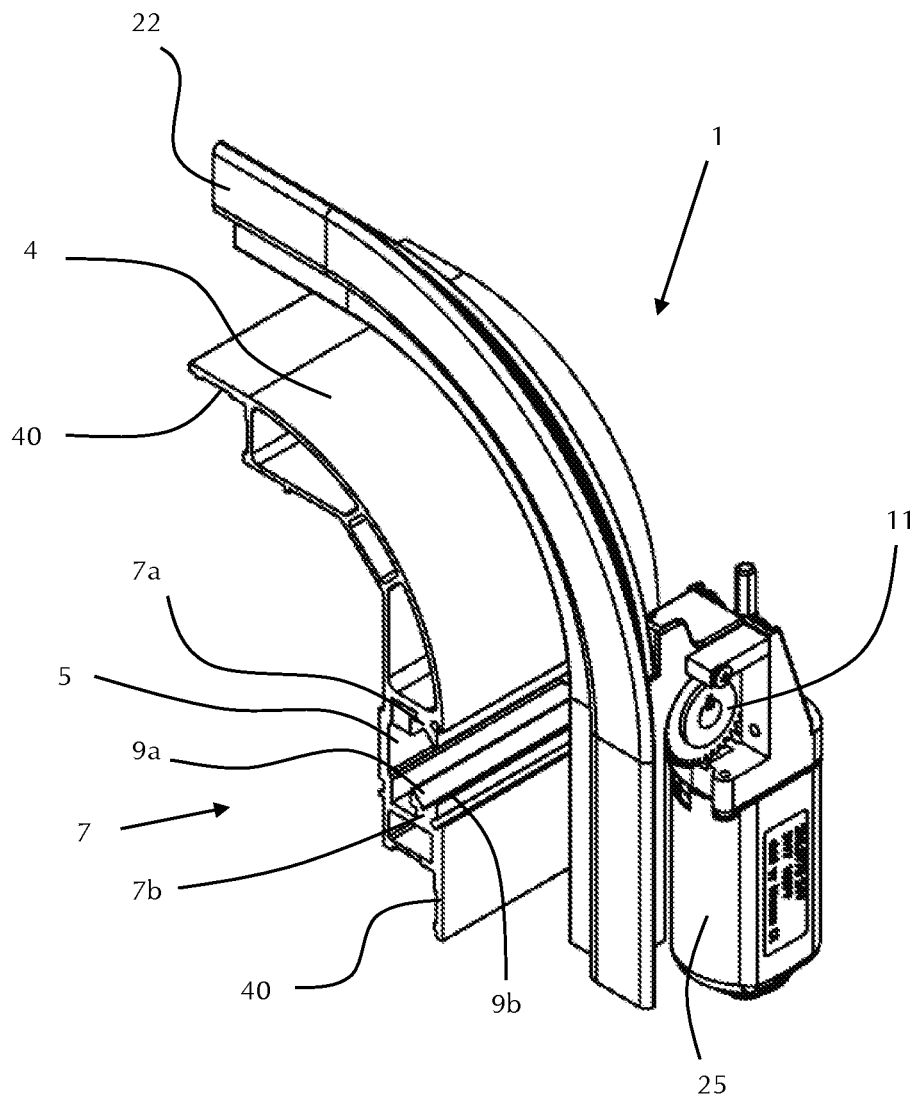
FIG. 2 shows another perspective view of the drive unit of FIG. 1.

FIG. 2 shows another perspective view of the system of FIG. 1. While FIG. 1 shows the system as it would be seen from within the vehicle, if the system was integrated into a vehicle, FIG. 2 shows the system from a perspective from outside of the vehicle. Of course some of the components shown in FIGS. 1 and 2 would be hidden from view if the system really was integrated into a vehicle.

FIG. 2 shows that structural member 4 comprises two flanges 40. If a respective wall panel is attached to each of these flanges 40, structural member 4 will form an edge of the slide-out room and drive unit 1 will serve as an edge unit of the slide-out room. Furthermore, FIG. 2 shows that a guide rail 7 is integrated into the elongate cavity 5 of structural member 4. The guide rail 7 shown in FIG. 2 has a two-part structure with a first rail section 7a and a second rail section 7b. First rail section 7a is configured to guide a guide member (not shown in FIG. 2) if the drive unit is arranged in the orientation shown in FIG. 2. Second rail section 7b is configured to guide the guide member if the drive unit is arranged upside down. In the orientation shown in FIG. 2 structural component 4 may be attached to a ceiling panel and to a side wall panel of a slide-out room, so as to form an upper edge unit of the slide-out room. In the reverse, i.e., upside down orientation (not shown in FIG. 2), structural component 4 may be attached to a floor panel and to a side wall panel of a slide-out room, so as to form a lower edge unit of the slide-out room. Since guide rail 7 has the two-part structure shown in FIG. 2, with first rail section 7a and second rail section 7b, guide rail 7 may serve its purpose irrespective of whether the drive unit is installed as shown in FIG. 2 or whether it is installed up-side down. Thus, only a single type of drive unit is required for constructing both an upper edge unit of a slide-out room and a lower edge unit of a slide-out room.

In the embodiment shown in FIG. 2 guide rail 7 comprises angled bearing faces which are shaped complementary to the cross section of the guide member (not shown in FIG. 2). More specifically, guide rail 7 comprises a first bearing face 9a and a second bearing face 9b. First and second bearing faces 9a/9b are integrated into first rail section 7a as well as into second rail section 7b.

Figure 3:
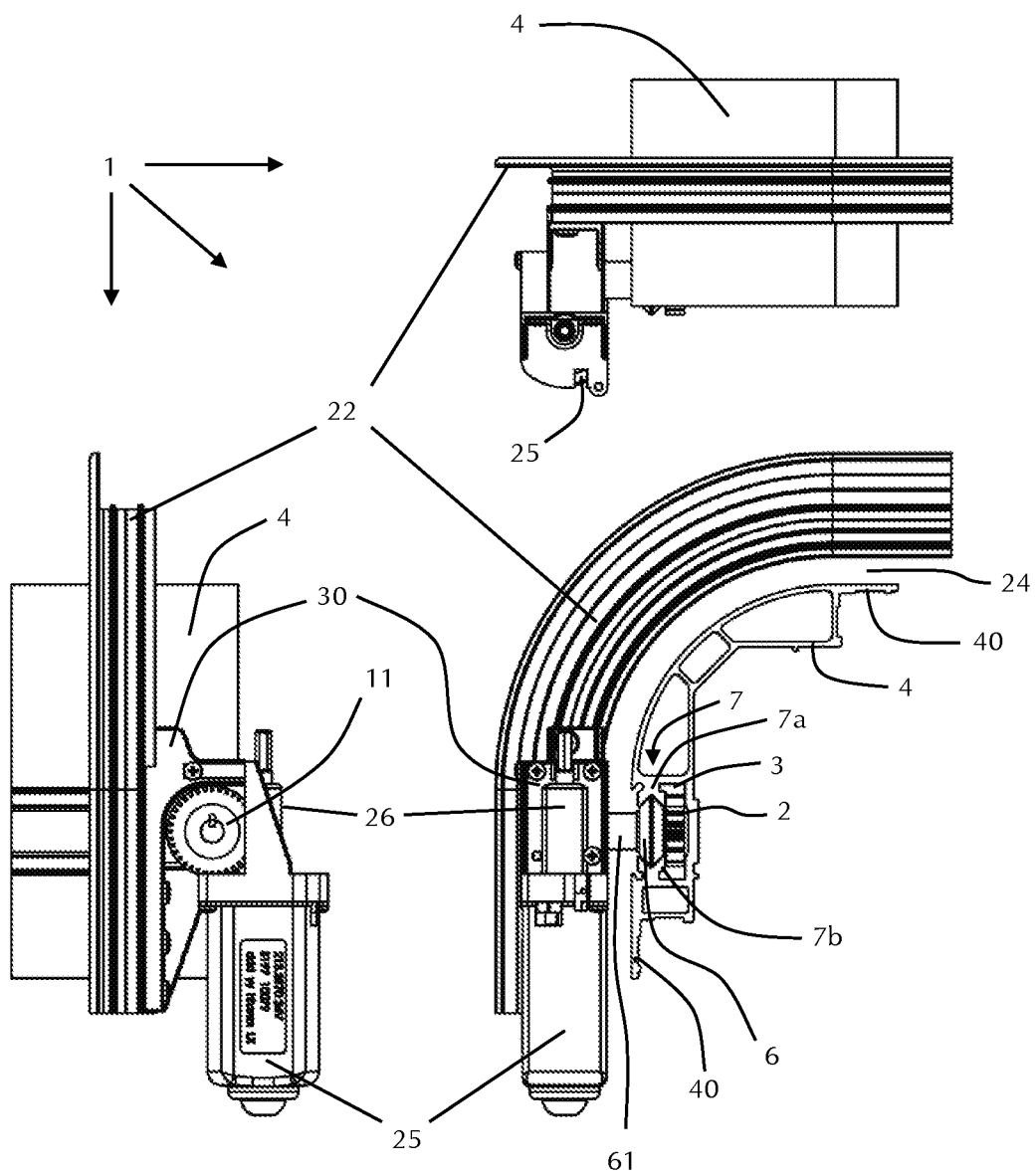
FIG. 3a shows a side view of the drive unit of FIG. 1.
FIG. 3b shows a corresponding rear view.
FIG. 3c shows a corresponding top view.

FIG. 3a shows a side view of the system shown in FIG. 1 and FIG. 2, FIG. 3b shows a corresponding rear view and FIG. 3c shows a corresponding top view. Most components and aspects of the invention shown in these figures were already discussed in connection with FIG. 1 and FIG. 2. Still these figures help to illustrate the invention by showing it from different perspectives. Furthermore, FIG. 3b illustrates a few additional aspects of the invention.

In FIG. 3b the shape of the guide member 6 can be readily recognized. In the shown embodiment guide member 6 is a guide roller with a substantially v-shaped cross section. The guide roller comprises a circular roll which is configured to roll along guide rail 7. The v-shaped cross section of guide roller 6 correlates with the shape of guide rail 7. More specifically, the angled bearing faces 9a/b of guide rail 7 are shaped complementary to the v-shaped cross section of guide roller 6. The matched geometry of guide roller 6 and guide rail 7 ensures that guide rail 7 will be securely and reliably guided along guide roller 6 as structural member 4 is being extended or retracted.

As further shown in FIG. 3b, first rail section 7a of guide rail 7 rests on guide roller 6 when drive unit 1 is oriented as shown in FIG. 3b. In contrast, second rail section 7b of guide rail 7 is located below guide roller 6. To ensure that guide roller 6 is free to rotate as first rail section 7a travels along guide roller 6, first rail section 7a and second rail section 7b are spaced apart from each other at a distance which is slightly greater than the diameter of guide roller 6. Thus, in the configuration shown in FIG. 3b, guide roller 6 is in contact with first rail section 7a but not in contact with second rail section 7b. If drive unit 1 was mounted upside down, for example for forming a lower edge unit, it would be vice versa. Second rail section 7b would be in contact with guide roller 6 but first rail section 7a would not be in contact with guide roller 6.

Returning to the configuration shown in FIG. 3b another aspect of the invention can be de-scribed. As described previously, when drive unit 1 is installed in a vehicle, mounting frame 22 is mounted to the wall of the vehicle and motor 25 is attached to mounting frame 22 with mounting bracket 30. Thus, mounting frame 22, mounting bracket 30, and motor 25 are carried by the wall of the vehicle. Guide roller 6 is also mounted to mounting bracket 30, in particular with the aid of bushing 61, which will be described in more detail in relation to FIG. 4. Since guide roller 6 is mounted to mounting bracket 30 (which is connected to the wall of the vehicle via mounting frame 22), a load path is defined for transferring load from guide roller 6 into mounting frame 22 and finally into the wall of the vehicle. In the embodiment shown in FIG. 3b this load path is employed for transferring the load or at least a significant portion of the load of structural member 4 and any components attached to structural member 4, such as wall panels, into mounting frame 22 and finally into the wall of the vehicle. Advantageously, this is achieved by making first rail section 7a of guide rail 7 rest on guide roller 6. Then, the load of structural member 4 is transferred to guide roller 6 via first rail section 7a of guide rail 7 and to mounting frame 22 and to the wall of the vehicle via the load path described above. Thus, guide roller 6 serves as a load bearing component.

Since the load of structural member 4 is born by guide roller 6, pinion 2 does not have to bear the load of structural member 4. Advantageously, pinion 2 is arranged not to bear a significant portion of the load of structural member 4. This ensures that pinion 2 is free to rotate in order to drive rack 3 and is not also burdened with bearing the load of structural member 4. Advantageously, guide roller 6 is arranged closer to mounting bracket 30 than pinion 2, i.e., the distance between guide roller 6 and mounting bracket 30 is shorter than the distance between pinion 2 and mounting bracket 30. By this, a particularly stable and robust mounting arrangement can be achieved.

As also shown in FIG. 3b, a gap 24 is formed between structural member 4 and mounting frame 22. This gap ensures that structural member 4 can move freely relative to mounting frame 22. This is necessary for a reliable operation of the slide-out room, where structural member 4 travels back and forth relative to mounting frame 22 as the slide-out room is being extended or retracted. Advantageously, a frame seal (not shown in FIG. 3b) is provided for sealing gap 24. The frame seal is preferably removably attached to mounting frame 22 so that a damaged seal can be conveniently replaced by a new seal.

Figure 4:
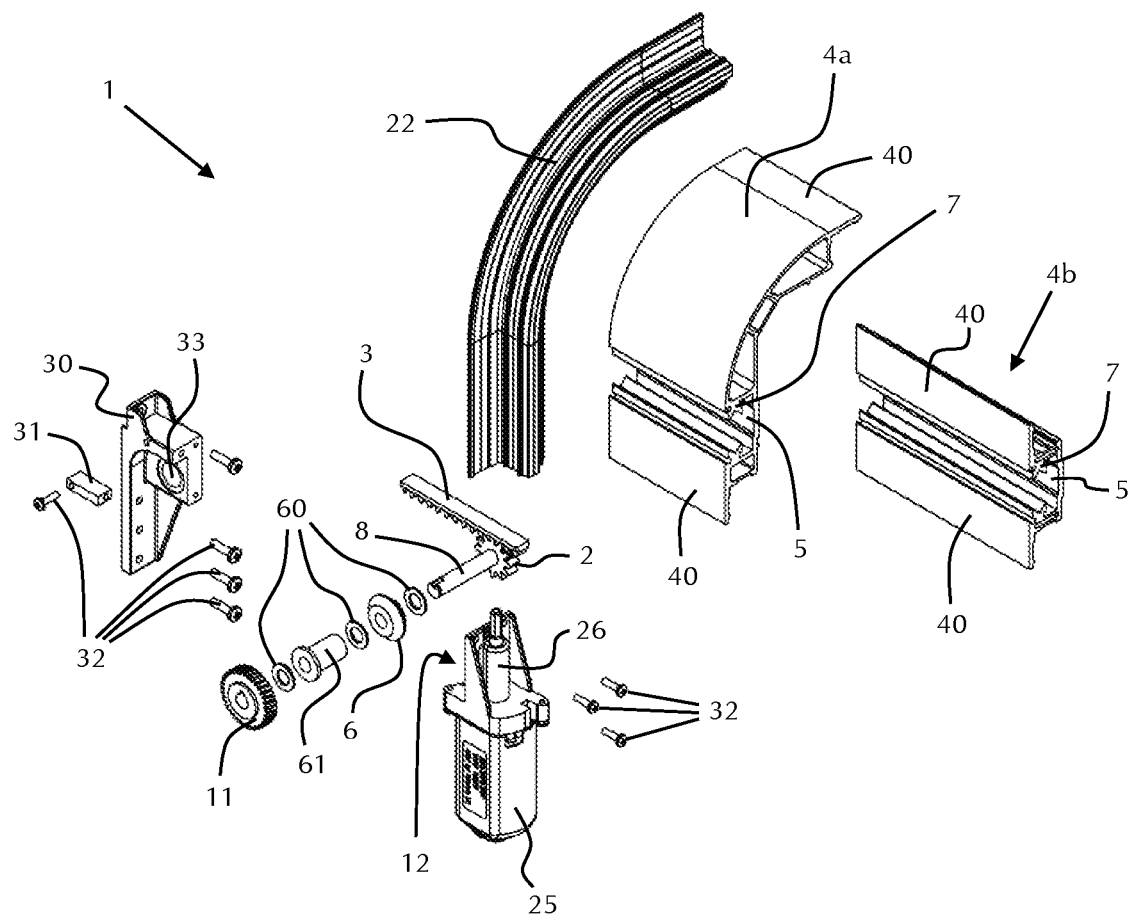
FIG. 4 shows an exploded view of a drive unit in accordance with the invention.

FIG. 4 shows an exploded view of the system shown in FIG. 1, FIG. 2, and FIGS. 3a/b/c. In FIG. 4 two alternative designs for the structural component 4 are shown, i.e., a first design with a rounded angular structural member 4a and a second design with a flat structural member 4b. With rounded angular structural member 4a drive unit 1 may conveniently be employed as an edge unit of a slide-out room and with flat structural member 4b drive unit 1 may conveniently be employed as a wall unit of a slide-out room.

Rounded angular structural member 4a comprises two flanges 40 arranged at opposite edges of structural member 4a. Structural member 4a has a curved section which results in the two flanges 40 to be oriented at right angles to each other. Thus, when a first panel is attached to one of the two flanges 40 and a second panel is attached to the other one of the two flanges 40, the two panels will also be at right angles to each other. Thus, an edge of a slide-out room may be formed.

Flat structural member 4b also comprises two flanges 40 arranged at opposite edges of the structural member. These flanges 40, however, are arranged in a common plane. Therefore, when a first panel is attached to one of the two flanges 40 and a second panel is attached to the other one of the two flanges 40, the two panels will be arranged in the same plane as the two flanges 40. Thus, a wall module for a slide-out room can be formed comprising two panels and flat structural member 4b arranged between the panels, all lying within a common plane. As shown in FIG. 4, flat structural member 4b is very compact so that it can be easily integrated into a wall of a slide-out room without requiring any or much additional space, in particular in the direction perpendicular to the wall. With such a compact structural member it is possible to include a larger number of drive units in a slide-out room without the drive mechanism of the slide-out room getting overly bulky. For example, three drive units, each comprising a flat structural member 4b, could be integrated into each of the two side walls of a slide-out room. Drive units comprising a flat structural member 4b can also be combined with drive units comprising a rounded angular structural member 4a. For example, a slide-out room may be designed with four drive units each comprising a rounded angular structural member 4a (as edge units) and two drive units each comprising a flat structural member 4b (as wall units). Other combinations may also be considered.

In the exploded view of FIG. 4 several further aspects of the drive mechanism of the invention can be recognized. As shown in FIG. 4, screws 32 are provided for attaching mounting bracket 30 to mounting frame 22 and for mounting motor 25 to mounting bracket 30. In addition, support block 31 is provided which is configured to be attached to mounting bracket 30 with a screw 32 and which serves as support for motor 25 and cover 26.

Furthermore, a drive shaft 8 is provided which is connected to pinion 2 and which is configured to transmit torque to pinion 2. Washers 60 and a bushing 61 are provided to be placed on drive shaft 8. In addition, guide roller 6 is configured to be placed on drive shaft 8. Furthermore, worm wheel 11 is configured to be attached to drive shaft 8 so that torque can be transmitted from worm wheel 11 to drive shaft 8. As shown in FIG. 4, pinion 2 is attached to one end of drive shaft 8. Then, a washer 60 is configured to be placed on drive shaft 8, then guide roller 6, then another washer 60, then bushing 61, then another washer 60, until finally worm wheel 11 is attached to the other end of drive shaft 8.

Drive shaft 8, together with pinion 2, guide roller 6, washers 60, bushing 61, and worm wheel 11, is configured to be mounted to mounting bracket 30. For this, mounting bracket 30 comprises a bore 33 which is configured to receive bushing 61. For mounting drive shaft 8 to mounting bracket 30, bushing 61 is inserted into bore 33 of mounting bracket 30. Then, drive shaft 8 with a first washer 60, guide roller 6, and a second washer 60 placed thereon is inserted into bushing 61. Subsequently, a third washer 60 is placed on the end of drive shaft 8 protruding from bushing 61 and finally worm wheel 11 is attached to this end of drive shaft 8. With this arrangement worm wheel 11, which is driven by a worm screw 12 attached to the drive shaft of motor 25 and hidden from view in FIG. 4 by cover 26, will drive pinion 2 via drive shaft 8, and pinion 2, which meshes with rack 3, will drive rack 3. Rack 3, which will be connected to structural member 4a/b, will drive structural member 4a/b. Advantageously, guide roller 6 is arranged closer to mounting bracket 30 than pinion 2.

Figures 5A, 5B:
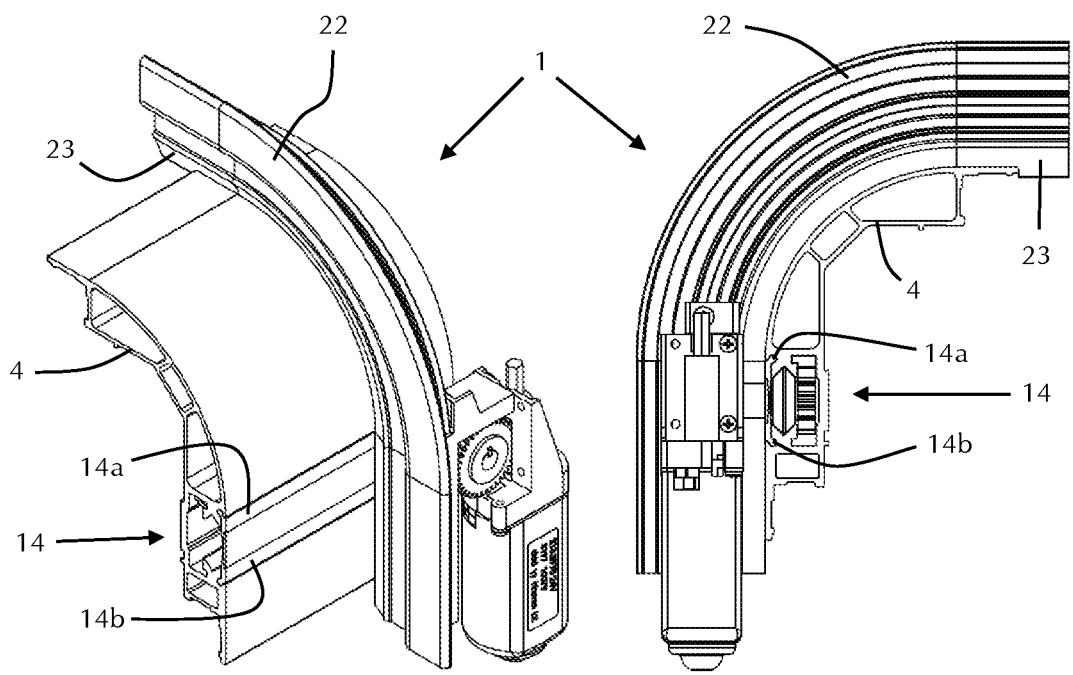
FIG. 5a shows a perspective view of a drive unit in accordance with the invention with a seal member and a frame seal.
FIG. 5b shows a corresponding rear view.

FIG. 5a shows a perspective view of a drive unit 1 in accordance with the invention with a seal member 14 and a frame seal 23. Seal member 14 is attached to structural member 4 such as to cover the opening of structural member 4. Seal member 14 has a two-piece structure with a first piece 14a arranged near a first edge of the opening and a second piece 14b arranged near a second edge of the opening. Together the first piece 14a and the second piece 14b cover the opening of structural member 4. At the same time, because they are flexible, they allow the elongate cavity of structural member 4 to be accessed from the outside via the opening.

FIG. 5a also shows that a frame seal 23 is attached to mounting frame 22. This frame seal 23 is configured to seal a gap formed between structural member 4 and mounting frame 22.

Figures 5C, 5D:
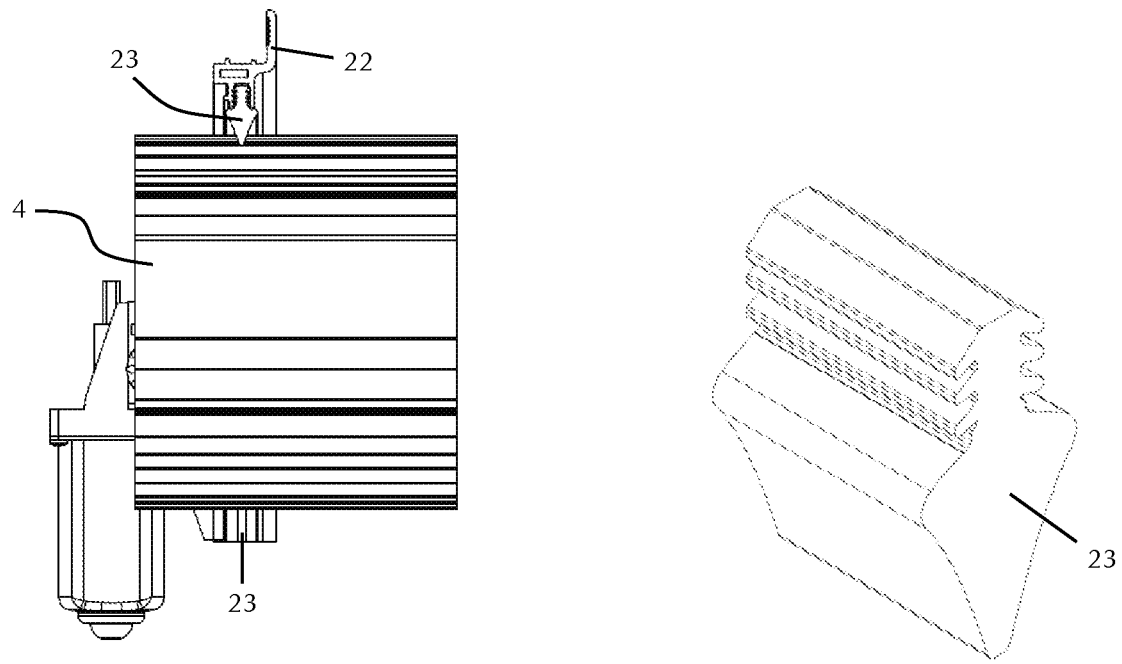
FIG. 5c shows a corresponding side view.
FIG. 5d shows a section of a frame seal.

FIG. 5b shows a rear view of the arrangement of FIG. 5a and FIG. 5c shows a corresponding side view. The manner in which frame seal 23 is attached to mounting frame 22 can best be seen in the upper part of FIG. 5c. A mounting section of frame seal 23 is jammed into a notch provided in mounting frame 22.

FIG. 5d shows a detailed view of a section of frame seal 23. Frame seal 23 comprises a mounting section for attaching frame seal 23 to a mounting frame and a sealing lip for sealing a gap.

Figure 6A:
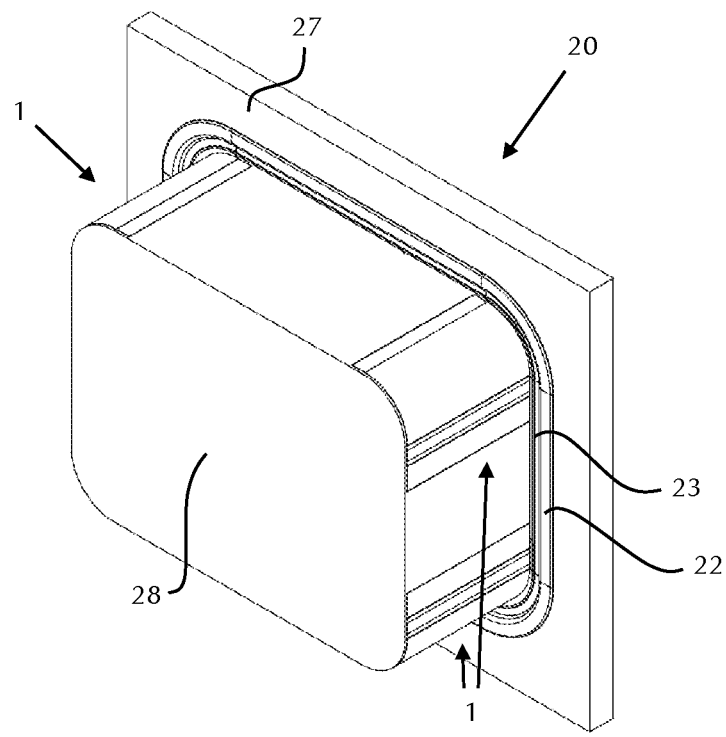
FIG. 6a shows a perspective view of a slide-out room assembly in accordance with the invention.

FIG. 6a shows a perspective view of a slide-out room assembly 20 in accordance with the invention in a partly extracted configuration. Slide-out room assembly 20 comprises a slide-out room 28 which is arranged in an opening provided in a wall 27 of a recreational vehicle. Slide-out room assembly 20 furthermore comprises a mounting frame 22 which is integrated into the opening provided in wall 27. Slide-out room 28 comprises drive units 1 arranged at edges of slide-out room 28. Slide-out room 28 is mounted to wall 27 via drive units 1 and mounting frame 22. FIG. 6a furthermore shows that a frame seal 23 is arranged to seal a gap formed between slide-out room 28 and mounting frame 23. FIG. 6a shows slide-out room assembly 20 from a perspective from outside of the vehicle.

Figure 6B:
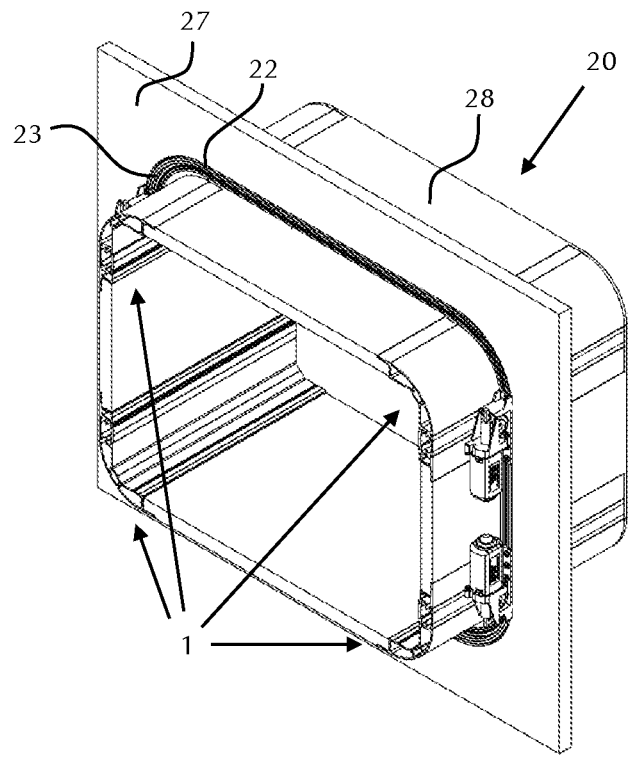

FIG. 6b shows another perspective view of the slide-out room assembly 20 of FIG. 6a, from a perspective from inside the vehicle. Here it can be recognized that four drive units 1 are pro-vided at four edges of slide-out room 28.

The drive unit in accordance with the invention has several advantages over prior art drive units. For example, when compared to a drive unit with a drive screw, the drive unit of the invention has the advantage that the elongate component (or rack) can be fixedly attached to the structural member, for example along its entire length. It could even be integrally formed with the structural member. Thus, the elongate component will always maintain the desired shape and geometry and will not be deformed, bent, or otherwise distorted, like drive screws often do. In addition, the drive unit of the invention can be easily manufactured at any desired length. It is even possible to cut the drive unit of the invention to the desired length after it has been assembled. This is due to the fact that the structural member with the elongate component arranged within the elongate cavity of the structural member can be easily cut to any desired length. With the prior art drive units employing drive screws, in particular with the one known from WO 2016/159769 A1, this is not possible because there the drive screw cannot be simply cut to length. In addition, the rack and pinion system of the drive unit of the invention is not self-locking in contrast to a drive screw system.

LIST OF REFERENCE NUMERALS 1 drive unit
2 rotary component
3 elongate component
4(a/b) structural member
5 elongate cavity
6 guide member
7 guide rail
7a first rail section
7b second rail section
8 drive shaft
9a/b bearing faces
10 worm drive
11 worm wheel
12 worm screw
13 opening
14 seal member
14a first piece of seal member
14b second piece of seal member
15a first edge of opening
15b second edge of opening
20 slide-out room assembly
22 mounting frame
23 frame seal
24 gap
25 motor
26 cover
27 wall
28 slide-out room
30 mounting bracket
31 support block
32 screw
33 bore
40 flange
60 washer
61 bushing While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A slide-out room assembly for a recreational vehicle, comprising:
  a slide-out room including a drive unit comprising:
    a rotary component,
    an elongate component, and
    a structural member configured to be coupled to a wall panel of the slide-out room and comprising an elongate cavity,
    wherein the elongate component and the rotary component are arranged within the elongate cavity of the structural member and are configured to mesh such that a rotary motion of the rotary component results in a linear motion of the elongate component together with the structural member relative to the rotary component; and
  a mounting frame configured to be integrated into an opening provided in a wall of the recreational vehicle, wherein the drive unit is operatively mounted to the mounting frame such that the structural member of the drive unit is configured to be translated relative to the mounting frame upon rotation of the rotary component.

2. The slide-out room assembly of claim 1, further comprising:
  a guide member and
  a guide rail,
  wherein the guide rail is integrated into the elongate cavity of the structural member and wherein the guide member and the guide rail are configured to cooperate to support the linear motion of the structural member.

3. The slide-out room assembly of claim 2, further comprising a drive shaft, wherein the rotary component and the guide member are axially arranged on the drive shaft.

4. The slide-out room assembly of claim 2, wherein the guide rail and the guide member are configured to cooperate so as to result in a reduction of load exerted on the rotary component by the structural member.

5. The slide-out room assembly of claim 2, wherein the guide rail has a two-part structure which allows the guide rail to support the linear motion of the structural member irrespective of whether the structural member is arranged in a first orientation or in a second orientation different from the first orientation.

6. The slide-out room assembly of claim 1, further comprising a worm drive including
  a worm wheel and
  a worm screw configured to cooperate with the worm wheel such that a rotary motion of the worm screw results in a rotary motion of the worm wheel,
  wherein the rotary motion of the worm wheel results in the rotary motion of the rotary component.

7. The slide-out room assembly of claim 6, wherein the worm wheel is coupled to the drive shaft.

8. The slide-out room assembly of claim 6, wherein the worm wheel and the worm screw are located outside the elongate cavity of the structural member.

9. The slide-out room assembly of claim 1, wherein the structural member comprises an opening extending essentially along the elongate cavity and configured to allow access to the elongate cavity of the structural member from outside of the structural member.

10. The slide-out room assembly of claim 9, further comprising a seal member which is attached to the structural member such as to cover the opening, wherein the seal member preferably has a two-piece structure with a first piece arranged near a first edge of the opening and a second piece arranged near a second edge of the opening, wherein preferably the shape and size of the first piece is essentially identical to the shape and size of the second piece.

11. The slide-out room assembly of claim 1, further comprising a motor configured to drive the rotary component of the drive unit, wherein the motor is mounted to the mounting frame or to a wall of the recreational vehicle.

12. The slide-out room assembly of claim 1, wherein the slide-out room comprises a first panel and a second panel and wherein the structural member of the drive unit is attached to the first panel and to the second panel so as to form an edge of the slide-out room.

13. The slide-out room assembly of claim 1, wherein the slide-out room comprises a first panel and a second panel and wherein the structural member of the drive unit is attached to the first panel and to the second panel and arranged between the first panel and the second panel such that the first panel, the structural member, and the second panel together form a wall of the slide-out room.

14. The slide-out room assembly of claim 13, wherein the wall formed by the first panel, the structural member, and the second panel is flat.

* * * * *